United States Patent
Chattopadhyay et al.

(10) Patent No.: US 11,968,085 B2
(45) Date of Patent: *Apr. 23, 2024

(54) UPGRADE A VERSION OF A SERVICE

(71) Applicant: Microsoft Technology Licensing, LLC, Redmond, WA (US)

(72) Inventors: Romit Chattopadhyay, Redmond, WA (US); Mariyan D. Fransazov, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,930

(22) Filed: Sep. 15, 2022

(65) Prior Publication Data

US 2023/0016109 A1 Jan. 19, 2023

Related U.S. Application Data

(63) Continuation of application No. 16/930,066, filed on Jul. 15, 2020, now Pat. No. 11,477,080, and a
(Continued)

(51) Int. Cl.
*H04L 67/143* (2022.01)
*G06F 8/65* (2018.01)
(Continued)

(52) U.S. Cl.
CPC .............. *H04L 41/082* (2013.01); *G06F 8/65* (2013.01); *G06F 9/45558* (2013.01);
(Continued)

(58) Field of Classification Search
CPC ................ H04L 67/1031; H04L 67/06; H04L 67/143; H04L 67/16; H04L 67/34
See application file for complete search history.

(56) References Cited

U.S. PATENT DOCUMENTS

| 10,083,026 B1* | 9/2018 | Venkata | .................. G06F 8/656 |
| 2008/0172736 A1* | 7/2008 | Barr | .................... H04L 41/0806 726/20 |

(Continued)

OTHER PUBLICATIONS

"Office Action issued in European Patent Application No. 18734349.6", dated Feb. 21, 2023, 4 Pages.
(Continued)

*Primary Examiner* — Ario Etienne
*Assistant Examiner* — Kidest Mendaye
(74) *Attorney, Agent, or Firm* — Mannava & Kang, P.C.

(57) ABSTRACT

According to examples, a host device may be instructed to pre-spawn a number of first host processes and a number of second host processes, in which the number of first host processes and the number of second host processes are defined in a first scaling constraint and are each greater than or equal to one. The host device may pre-spawn the second host processes in one or more computing nodes through identification of a host process of the first host processes that is unbound from a client session, termination of the identified host process, and pre-spawning of a second host process that provides a second version of the service based on the termination. The host device may also decrease the number of first host processes and increase the number of second host processes in the one or more computing nodes as defined in a second scaling constraint.

20 Claims, 8 Drawing Sheets

Related U.S. Application Data continuation of application No. 15/620,650, filed on Jun. 12, 2017, now Pat. No. 10,749,743.

(51) Int. Cl.

| | |
|---|---|
| *G06F 9/455* | (2018.01) |
| *G06F 16/23* | (2019.01) |
| *H04L 41/082* | (2022.01) |
| *H04L 41/0859* | (2022.01) |
| *H04L 67/00* | (2022.01) |
| *H04L 67/06* | (2022.01) |
| *H04L 67/1031* | (2022.01) |
| *H04L 67/51* | (2022.01) |

(52) U.S. Cl.
CPC ...... *G06F 16/2379* (2019.01); *H04L 41/0859* (2013.01); *H04L 67/06* (2013.01); *H04L 67/1031* (2013.01); *H04L 67/143* (2013.01); *H04L 67/34* (2013.01); *H04L 67/51* (2022.05)

(56) References Cited

U.S. PATENT DOCUMENTS

| | | | | |
|---|---|---|---|---|
| 2014/0101652 | A1* | 4/2014 | Kamble | G06F 8/656 717/171 |
| 2014/0282469 | A1* | 9/2014 | Johnson | G06F 8/65 717/170 |
| 2016/0041819 | A1* | 2/2016 | Mantena | H04W 4/60 717/170 |

OTHER PUBLICATIONS

U.S. Appl. No. 15/620,650, filed Jun. 12, 2017.
"Amazon EC2 Auto Scaling", Retrieved From: https://aws.amazon.com/ec2/autoscaling/, Retrieved on: Aug. 30, 2023, 7 Pages.
"Auto Scaling Groups", Retrieved From: https://docs.aws.amazon.com/autoscaling/ec2/userguide/auto-scaling-groups.html, Retrieved on: Aug. 30, 2023, 2 Pages.
"AWS CLI Command Reference", Retrieved From: https://docs.aws.amazon.com/cli/latest/reference/, Retrieved on: Aug. 30, 2023, 38 Pages.
"Replace Auto Scaling Instances Based on an Instance Refresh", Retrieved From: https://docs.aws.amazon.com/autoscaling/ec2/userguide/asg-instance-refresh.html, Retrieved on: Aug. 30, 2023, 5 Pages.
"Rolling Deployments", Retrieved From: https://docs.aws.amazon.com/whitepapers/latest/overview-deployment-options/rolling-deployments.html, Retrieved on: Aug. 30, 2023, 1 Page.
"Scale the Size of your Auto Scaling Group", Retrieved From: https://docs.aws.amazon.com/autoscaling/ec2/userguide/scale-your-group.html, Retrieved on: Aug. 30, 2023, 3 Pages.
"Set Capacity Limits on your Auto Scaling Group", Retrieved From: https://docs.aws.amazon.com/autoscaling/ec2/userguide/asg-capacity-limits.html, Retrieved on: Aug. 30, 2023, 3 Pages.
"What is Amazon EC2 Auto Scaling?", Retrieved From: https://docs.aws.amazon.com/autoscaling/ec2/userguide/what-is-amazon-ec2-auto-scaling.html, Retrieved on: Aug. 30, 2023, 4 Pages.
Chia, Glenn, "Sample EC2 Auto Scaling Groups Instance Refresh Solution", Retrieved From: https://github.com/aws-samples/ec2-auto-scaling-instance-refresh-sample, Nov. 9, 2021, 8 Pages.
"EC2-Auto-Scaling-Instance-Refresh-Sample / Images / asg-Instance-Refresh-Activity-History.Png", 2 Pages.
Peven, Ben, "Introducing Instance Refresh for EC2 Auto Scaling", Retrieved From: https://aws.amazon.com/blogs/compute/introducing-instance-refresh-for-ec2-auto-scaling/, Jun. 16, 2020, 4 Pages.
Shrivastava, Saurabh, "Scale Your Web Application—One Step at a Time", Retrieved From: https://aws.amazon.com/blogs/architecture/scale-your-web-application-one-step-at-a-time/, Jan. 16, 2018, 4 Pages.
"EC2-Auto-Scaling-Instance-Refresh-Sample / Images / Ec2-instance-Refresh-Png", 1 Page.

* cited by examiner

UPGRADE A VERSION OF A SERVICE

PRIORITY CLAIM

This application is a Continuation of commonly assigned and co-pending U.S. patent application Ser. No. 16/930,066, filed Jul. 15, 2020, entitled "UPGRADE A VERSION OF A SERVICE", which is a Continuation of U.S. patent application Ser. No. 15/620,650, filed Jun. 12, 2017, entitled "UPGRADE A VERSION OF A SERVICE", the entire contents of which are hereby incorporated by reference in their entireties.

BACKGROUND

Large-scale networked systems are employed in a variety of settings for running service applications and maintaining data for business and operational functions. For instance, a data center within a large-scale networked system may support the operation of a variety of differing services (e.g., web applications, email applications, search engine applications, etc.). These networked systems typically include a large number of nodes distributed throughout one or more data centers, in which each node resembles a physical machine or a virtual machine running on a physical host. Due partly to the large number of the nodes that may be included within such large-scale systems, rolling out an update to program components of one or more service applications can be a time-consuming and costly process.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
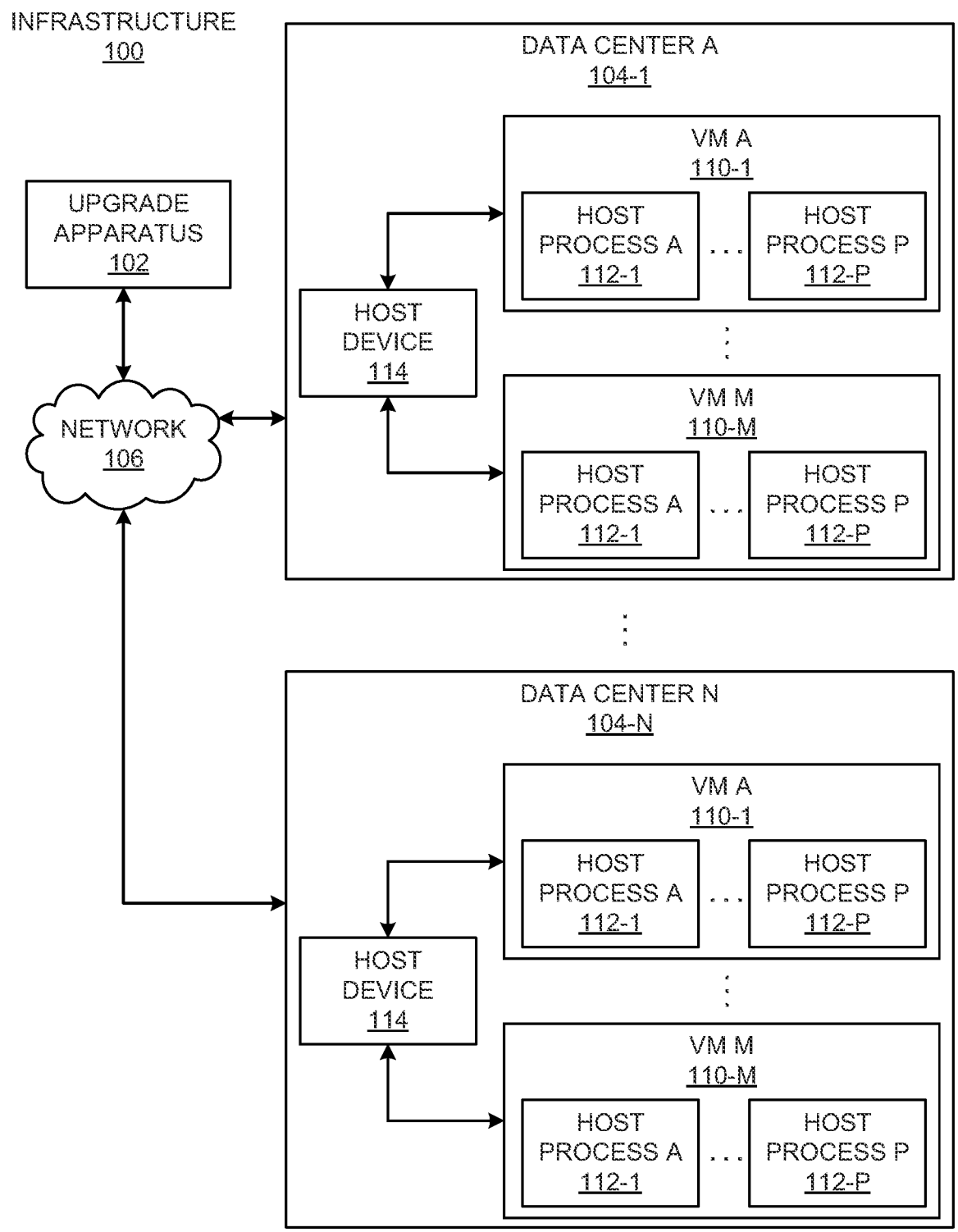
FIG. 1A shows a block diagram of an infrastructure in which an upgrade apparatus may be implemented to upgrade a service in accordance with an embodiment of the present disclosure.

For simplicity and illustrative purposes, the present disclosure is described by referring mainly to embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Services, such as web applications, email applications, etc., are often updated over time to improve the services, enhance security on the services, etc. Technical issues, such as disruptions in the computing nodes that host the services, incompatibility of client access to the services, etc., are often encountered in conventional systems and methods for rolling out of the updates across large-scale networked systems. That is, for instance, conventional systems and methods for updated services across large-scale networked systems may result in computing nodes being unavailable and/or failing to provide the services according to client requests. Additionally, if there is a disaster, e.g., a crash, a transient network error, a misconfiguration, coding error, etc., during the update, the service code may be destroyed, which may result in the service being unavailable for an extended period of time.

Disclosed herein are methods and apparatuses for upgrading a version of a service that do not suffer from the technical issues of conventional systems and methods. Particularly, the methods and apparatuses disclosed herein may upgrade a version of a service in a safe manner while enabling backward compatibility to an existing or older version of the service. In addition, the methods and apparatuses disclosed herein may maintain the existing version of the service and thus remain available to be bound to client requests during upgrade of the service version. In this regard, the methods and apparatuses disclosed herein may afford technical solutions to the technical issues discussed above. The technical solutions may include that at least some of the computing nodes that host an earlier or existing version of the service are maintained in an operational state in the event of disasters to the computing nodes that host the newer version of the service and thus, the methods and apparatuses disclosed provide improved fault tolerance as compared with conventional systems and methods. In other words, the states of the services provided by networked computing nodes may be maintained in the event of breaking changes and/or disasters during the rollout of the service upgrade.

Generally speaking, the methods disclosed herein may include the communication of an instruction to a host device to pre-spawn a number of first host processes configured to provide a first version of the service in a computing node and to pre-spawn a number of second host processes configured to provide a second version of the service. In addition, the number of first host processes and the number of second host processes may be defined in a first scaling constraint. As used herein, the terms "first host process" and "second host process" are not intended to respectively denote an initial and a second host process. Instead, the terms "first host process" and "second host process" are used herein to distinguish these host processes from each other. In addition, the number of first host processes and the number of second host processes may each be greater than or equal to one.

The methods disclosed herein may also include the receipt of an indication that each of the second host processes is operating properly. In response to receipt of the indication, the methods may further include the communication of an instruction to the host device to decrease the number of first host processes and to increase the number of second host processes as defined in a second scaling constraint. A number of first host processes that provide the first version of the service may be maintained to enable backward compatibility to client requests for the first version and the number of second host processes that provide the second version may be increased following validation of the second host processes.

According to examples, the increase in second host processes may not occur until the second host processes are validated, e.g., determined to be operating properly. In this regard, the second version of the service may not be fully deployed until the second host processes have been determined as operating properly (or equivalently, operating normally). In addition, the methods disclosed herein may be applied to pre-spawn second host processes in computing nodes across multiple data centers and the increase in second host processes may not occur until the second host processes across the multiple data centers are validated. In this regard, the second version of the service may not be fully deployed until a determination is made that the second host processes are operating properly.

To avoid disrupting client sessions that are bound to host processes, the host device may incrementally pre-spawn the second host processes. That is, the host device may identify and terminate first host processes that become unbound from client sessions until a count of the identified first host processes is equal to the number of first host processes as defined in the first scaling constraint. In addition, the host device may incrementally, as the identified first host processes are terminated, pre-spawn second host processes until a count of the second host processes is equal to the number of second host processes as defined in the first scaling constraint. Similar procedures may be implemented to terminate the first host processes and incrementally pre-spawn the second host processes until the counts of the first host processes and the second host processes equal the numbers defined in the second scaling constraint.

Figure 1B:
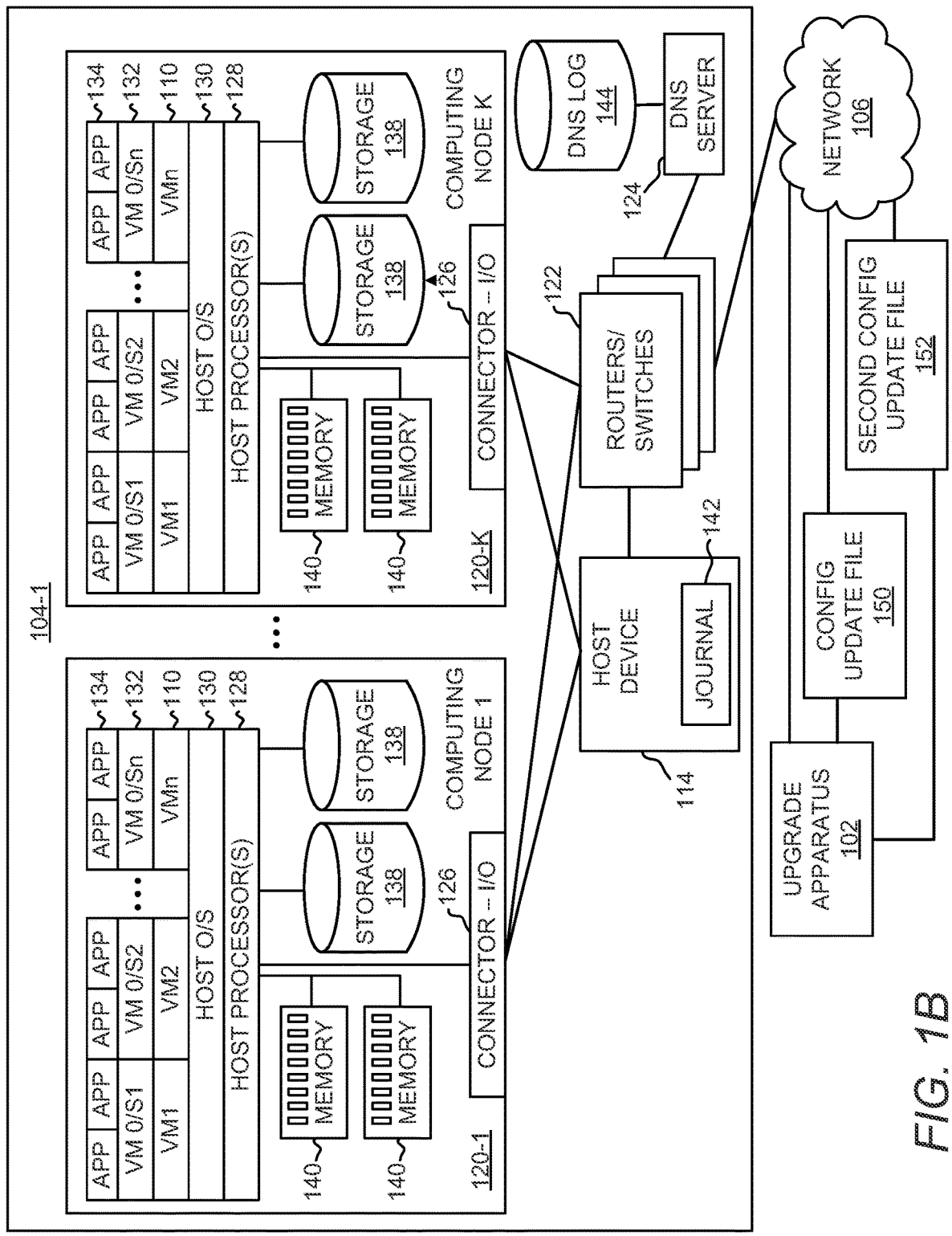
FIG. 1B shows a block diagram of one of the data centers depicted in FIG. 1A in accordance with an embodiment of the present disclosure.

Reference is made first to FIGS. 1A and 1B. FIG. 1A shows a block diagram of an infrastructure 100 in which an upgrade apparatus 102 may be implemented to upgrade a service, which may be an application, an email service, a search engine service, a web site, or the like, across one or more data centers 104-1 to 104-N, in accordance with an embodiment of the present disclosure. FIG. 1B shows a block diagram of one of the data centers 104-1 depicted in FIG. 1A in accordance with an embodiment of the present disclosure. It should be understood that the infrastructure 100 and the data center 104-1 respectively depicted in FIGS. 1A and 1B may include additional components and that some of the components described herein may be removed and/or modified without departing from scopes of the infrastructure 100 and the data center 104-1.

As shown in FIGS. 1A and 1B, an upgrade apparatus 102 may be in communication with the data centers 104-1 to 104-N, in which the variable "N" may represent an integer value greater than one, via an external network 106, which may be, for example, a local area network (LAN) or the Internet. The upgrade apparatus 102 may be located in one of the data centers 104 or another location and may be a processor, a microprocessor, a computing device, a server computer, or the like, and may handle the upgrading of services executed in the data centers 104. The upgrade apparatus 102 may also be a distributed set of machines. In any regard, the upgrade apparatus 102 may implement and coordinate the upgrading of a version of a service in one or more of the data centers 104 such that a second (e.g., newer or different) version of the service may be safely rolled out while providing compatibility back to a first (e.g., older or current) version of the service. Various manners in which the upgrade apparatus 102 may operate are discussed in greater detail herein.

Generally speaking, each of the data centers 104 provides cloud computing services and/or distributed computing services. According to examples, the data centers 104 may be located in different geographical locations with respect to each other. For instance, the data centers 104 may be located in different counties, in different states, in different countries, etc. In other examples, some of the data centers 104 may be located in the same geographical location but may be located in separate buildings, separate rooms, etc.

The data center 104-1 is depicted in FIG. 1B as including a plurality of computing nodes 120-1 to 120-K, e.g., servers, blades, etc., a host device 114, routers/switches 122, and a Domain Name System (DNS) server 124. Each of the other data centers 104-2 to 104-N may have similar configurations and thus the description of the data center 104-1 may also pertain to the other data centers 104-2 to 104-N. The host device 114 may manage the computing nodes 120 and may distribute requests and workloads over the computing nodes 120 such that client requests are directed to the computing nodes 120 that host the appropriate services and versions of the services for the client requests. For instance, the host device 114 may distribute requests and workloads to avoid situations in which any of the computing nodes 120 may become overloaded and may also maximize available capacity and performance of the computing nodes 120. The host device 114 may further implement service version upgrades across the nodes 120. The routers/switches 122 support data traffic between the computing nodes 120 and between the data center 104-1 and external resources and users (not shown) via the external network 106.

The computing nodes 120 may be standalone computing devices and/or the computing nodes 120 may be configured as individual blades in a rack of one or more server devices. The computing nodes 120 have an input/output (I/O) connector 126 that manages communication with other data center 104-2 to 104-N entities. One or more host processors 128 on each computing node 120 run a host operating system (O/S) 130 that may support multiple virtual machines (VM) 110-1 to 110-M, in which the variable "M" represents an integer value greater than one and may differ for different ones of the data centers 104. Each VM 110 may run its own O/S so that each VM O/S 132 on a computing node 120 is different, or the same, or a mix of both. The VM O/S's 132 may be, for example, different versions of the same O/S (e.g., different VMs running different current and legacy versions of the Windows® operating system). In addition, or as another example, the VM O/S's 132 may be provided by different manufacturers (e.g., some VMs run the Windows® operating system, while others VMs run the Linux® operating system).

Each VM 110 may also run host processes 112-1 to 112-P that provide one or more services or applications (App) 134 and/or versions of the one or more services or applications. It should be noted that services and applications may be used interchangeably herein and that the variable "P" represents a value greater than one and may differ for different ones of the VMs 110-1 to 110-M. Each of the computing nodes 120 may also include storage 138 (e.g., hard disk drives (HDD)) and memory 140 (e.g., RAM) that the host processors 128 and the VMs 110 may access and use for storing software code, data, etc.

The data center 104-1 provides pooled resources on which applications 134 may dynamically be provisioned and scaled as needed without having to add servers or additional networking. This allows clients to obtain computing resources without having to procure, provision, and manage infrastructure on a per-application, ad-hoc basis. The data center 104-1 generally allows resources to be scaled up or scaled down dynamically to meet client needs.

The host device 114 may control various aspects of the VMs 110, such as which of the host processes 112 of the VMs 110 provides which version of a service, which host process 112 is to be bound to which client session, etc. For instance, the host device 114 may pre-spawn a certain number of the host processes 112 that provide a current version of the service. As used herein, pre-spawning a host process 112 may be defined as launching the instance of the host process 112 in the underlying operating system 130 containing the binaries of the service 134 for a specific version. A host process 112 may be deemed to be pre-spawned because the host process 112 may be spawned before a client actually requests the instance of the service 134, which may improve latency in binding the host process 112 to a client session. In one regard, all of the pre-spawned host processes may always be in an unbound state, e.g., not connected to a client session.

The host device 114 may pre-spawn a host process by initializing the host process that provides the version of the service. In addition, the certain number of the host processes 112 may be based upon, for instance, a number of instances of the service that are to be pre-spawned as set forth in a service level agreement between a client and a cloud services provider. The host device 114 may maintain and update a journal 142 that identifies which of the pre-spawned host processes 112 provide which version of the service. Generally speaking, pre-spawning the host processes 112 that provide a particular version of a service may reduce the latency associated with binding client sessions to the host processes 112. In other words, pre-spawning the host processes 112 may enable the host processes 112 to be bound to client sessions in a relatively more time-efficient manner as compared with binding the host processes 112 to client sessions without pre-spawning the host processes 112, e.g., spawning the host processes 112 when the host processes 112 are bound to the client sessions.

When the host device 114 receives a request for a service 134, the host device 114 may select one of the host processes 112 of the VMs 110 to be bound to a client session corresponding to the request. The host device 114 may select the host process 112 to be bound to the client session based upon various factors such as the version of the requested service 134, availabilities of the host processes 112, load balancing considerations across the computing nodes 120, etc. Once the host device 114 has selected the host process 112, the host device 114 may bind the selected host process 112 to the client session. In some examples, the request may specify the version of the service to which the request is to be bound and the host device 114 may select a pre-spawned host process 112 that provides the identified version of the service. In other examples, the request may not specify the version of the service and the host device 114 may select a pre-spawned host process 112 that provides one of the versions of the service to be bound to the client request.

The host device 114 may also receive an instruction from the upgrade apparatus 102 to begin providing a second (or equivalently, new, upgraded, etc.) version of a service 134. For instance, the upgrade apparatus 102 may communicate the second version of the service 134 through a configuration update file 150 to the host device 114. In other examples, the host device 114 may receive or access the second version of the service 134 from a source other than the upgrade apparatus 102. In any regard, the configuration update file 150 may include a scaling constraint (also referenced as a first scaling constraint) that defines the number of first host processes 112 in the VMs 110 of a computing node 120 that provide the first version of the service 134 and the number of second host processes 112 in the VMs 110 of the computing node 120 that provide the second version of the service 134. In response to receipt of the configuration update file 150, the host device 114 may pre-spawn a number of second host processes 112 in the VMs 110 on one or more of the computing nodes 120 to host the second version of the service 134 according to the number of host processes identified in the configuration update file 150.

As discussed in greater detail herein, instead of automatically terminating a first host process 112 that provides a first version of the service 134 that is currently bound to a client session, the host device 114 may terminate host processes 112 that are unbound to client sessions or may wait until the client sessions on the host processes 112 have ended before terminating the host processes 112. The host device 114 may also incrementally pre-spawn the second host processes 112 to host the second version as the first host processes 112 become unbound from client sessions and are terminated. In this regard, the host device 114 may not disrupt any current client sessions in order to pre-spawn the second host processes 112. Additionally, as the number of pre-spawned second host processes 112 increases, the host device 114 may maintain some of the first host processes 112 and thus maintain backward compatibility for clients that request the first version of the service 134.

The upgrade apparatus 102 may communicate the upgrade configuration file to the host devices 114 in each of the data centers 104 for which the service 134 is to be upgraded. In this regard, each of the host devices 114 may pre-spawn a number of second host processes 112 on one or more of the computing nodes 120 according to the number of host processes identified in the configuration update file 150. A number of first host processes 112 in each of the data centers 104 may also provide the first version of the service 134 following the pre-spawning of the second host processes 112. For instance, the scaling constraint may define that each of the computing nodes 120 is to contain a larger number of first host processes 112 than the number of second host processes 112. By way of particular example in which a VM 110 contains 50 host processes, the scaling constraint may define that the VM 110 is to execute 48 pre-spawned first host processes 112 and to execute two pre-spawned second host processes 112.

Following the pre-spawning of the host processes 112 according to the scaling constraint set forth in the configuration update file 150, the pre-spawned second host processes 112 may be validated. The second host processes 112 may be validated through execution of runners on the host processes 112. That is, runners, which may be test scripts, may be executed on the second version instances of the service 134 to determine whether the service instances are operating properly, e.g., as intended, according to specifications, normally, etc. If a determination is made that a service instance is not operating properly, the host device 114 may return an indication of the error to the upgrade apparatus 102. The upgrade apparatus 102 may cease the upgrading operation until a determination is made that the error has been corrected. However, if the host device 114 determines the pre-spawned second host processes 112 are validated, e.g., operating properly, operating normally, etc., the host device 114 may send an indication that the second host processes 112 are validated to the upgrade apparatus 102.

The upgrade apparatus 102 may receive the validation or error indications from the host devices 114 for which the service 134 is to be upgraded. In response to receipt of validations from the host devices 114 for which the service 134 is to be upgraded, the upgrade apparatus 102 may communicate a second configuration update file 152 to the host devices 114. The second configuration update file 152 may include a second scaling constraint that defines a number of host processes 112 in the VMs 110 of the computing node 120 that is to host the first version of the service 134 and the number of host processes 112 in the VMs 110 of the computing node 120 that is to host the second version of the service 134. In response to receipt of the second configuration update file 152, the host devices 114 may pre-spawn a number of second host processes 112 on one or more of the computing nodes 120 that provide the second version of the service 134 according to the second scaling constraint identified in the second configuration update file 152. The host devices 114 may also pre-spawn the second host processes 112 incrementally as discussed herein, e.g., as the first host processes 112 become unbound to client sessions and are terminated.

A number of host processes 112 may also provide the first version of the service 134 following the pre-spawning of the second host processes 112. For instance, the first scaling constraint may define that each of the computing nodes 120 is to run a larger number of first host processes 112 than second host processes 112. By way of particular example in which a VM 110 contains 50 host processes, the first scaling constraint may define that the VM 110 is to execute 48 first host processes 112 and to execute two second host processes 112.

Although particular reference is made herein to the host processes 112 being pre-spawned to provide either a first version or a second version of the service 134, it should be understood that the host processes 112 may be pre-spawned to provide other versions of the service 134 without departing from scopes of embodiments disclosed herein. That is, for instance, the first scaling constraint included in the first configuration update file 150 may define a number of first host processes 112, a number of second host processes 112, a number of third host processes 112 that provide a third version of the service 134, and so forth. Additionally, the second scaling constraint included in the second configuration update file 152 may define a number of first host processes 112, a number of second host processes 112, a number of third host processes 112, and so forth. One or more of the numbers of host processes 112 in the second scaling constraint may differ from corresponding numbers of host processes 112 in the first scaling constraint, for instance, to increase the number of host processes 112 that are pre-spawned to provide newer versions or the newest version of the service 134.

The Domain Name System (DNS) server 124 resolves domain and host names into IP addresses for all roles, applications, and services in the data center 104-1. A DNS log 144 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing may be used to identify dependencies.

Figure 2:
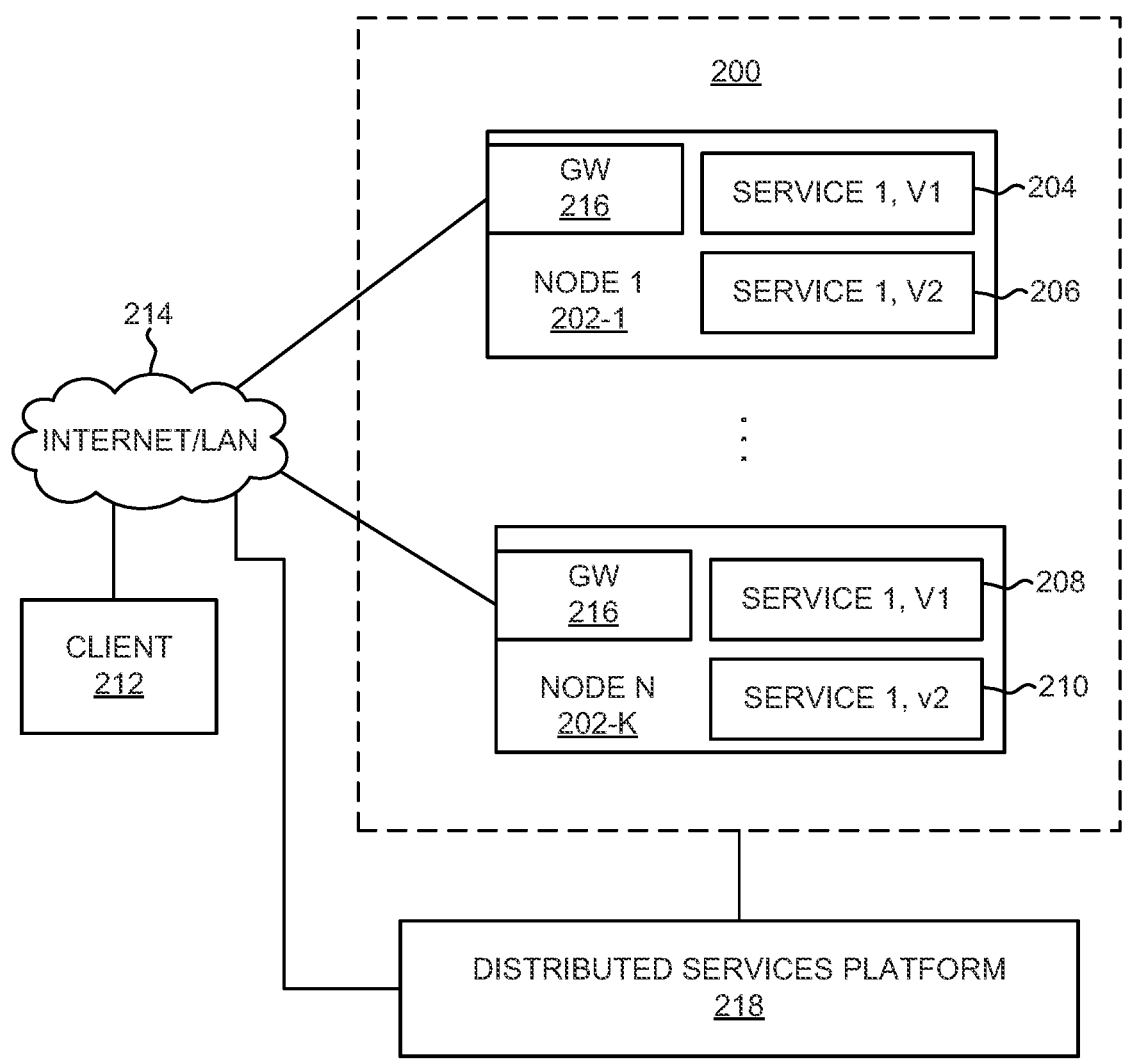
FIG. 2 shows a block diagram of a cluster composed of N nodes in accordance with an embodiment of the present disclosure.

FIG. 2 depicts a block diagram of a cluster 200 composed of N nodes 202, which may represent different servers, processors, or VMs. For example, in the example illustrated in FIG. 1B, servers 120, host processors 128, or VMs 110 may correspond to the different nodes 202. The nodes 202 may operate as part of a cluster 200 that manages various instances of services 204-210, e.g., different versions of the service instances 204-210. The cluster 200 controls the service instances 204-210 running on the nodes 202 and may balance the service loads among the nodes 202. The duster 200 also provides backup and redundancy for the service instances 204-210. In a data center environment, tens of thousands of service instances may be deployed on a cluster 200.

Users may access the service instances 204-210 deployed on the cluster 200 via a client 212, which may be, for example, an application running on a desktop, laptop, tablet computer, mobile device, etc. The client 212 may communicate with the cluster 200 through a network 214, which may be a public or private data network, such as the Internet, an intranet, or a LAN. The client 212 accesses the service instances 204-210 running on the cluster 200 though a gateway 216, which is the entry point for the client 212 to access the nodes 202. In order to access a service instance 204, the client 212 connects to a gateway 216 and may register a filter to determine an endpoint assigned to a target service instance 204 running on the cluster 200. The client 212 then communicates with the target service instance 204-210.

The cluster 200 may be supported by a distributed services platform 218 that understands available infrastructure resources and requirements of the service instances 204-210 running on the cluster 200. The distributed services platform 218 generally provides comprehensive runtime and lifecycle management capabilities and enables automatic updating and self-healing to ensure delivery of highly available and durable services via the cluster 200. The distributed services platform 218 supports microservices in which complex applications are composed of small, independently versioned services running at very high density on a shared pool of nodes 202, such as the cluster 200. In one example, the distributed services platform 218 may be the Azure Service Fabric provided by Microsoft Corporation®. The distributed services platform 218 manages the service instance endpoints in the cluster 200. A distributed services platform 218, such as Microsoft Corporation's Service Fabric®, is a framework for hosting services. In any regard, the distributed services platform 218 may include the host device 114 and the nodes 202 may be operated under a microservices framework.

When a new service is started on the cluster 200, the service instance is assigned an endpoint. For example, in FIG. 2, a first instance of Service 1, Version 1 (204) is assigned an endpoint on the first node 1 (202-1). A second instance of Service 1, Version 1 (208) is assigned an endpoint on the second node N (202-K). Other service instances, Service 1, V2 (206) and Service 1, V2 (210) are respectively assigned endpoints on the first node 202-1 and the second node 202-K. The client 212 connects to a gateway 216 and obtains the endpoint of a target service. The service instances 204-210 may be spread across multiple nodes 202-1 and 202-K as illustrated in FIG. 2. Over time, services may be moved due to node failure, load balancing, service upgrades, and/or variations in user demand. Accordingly, the endpoint for a target service may change over time.

Figure 3:
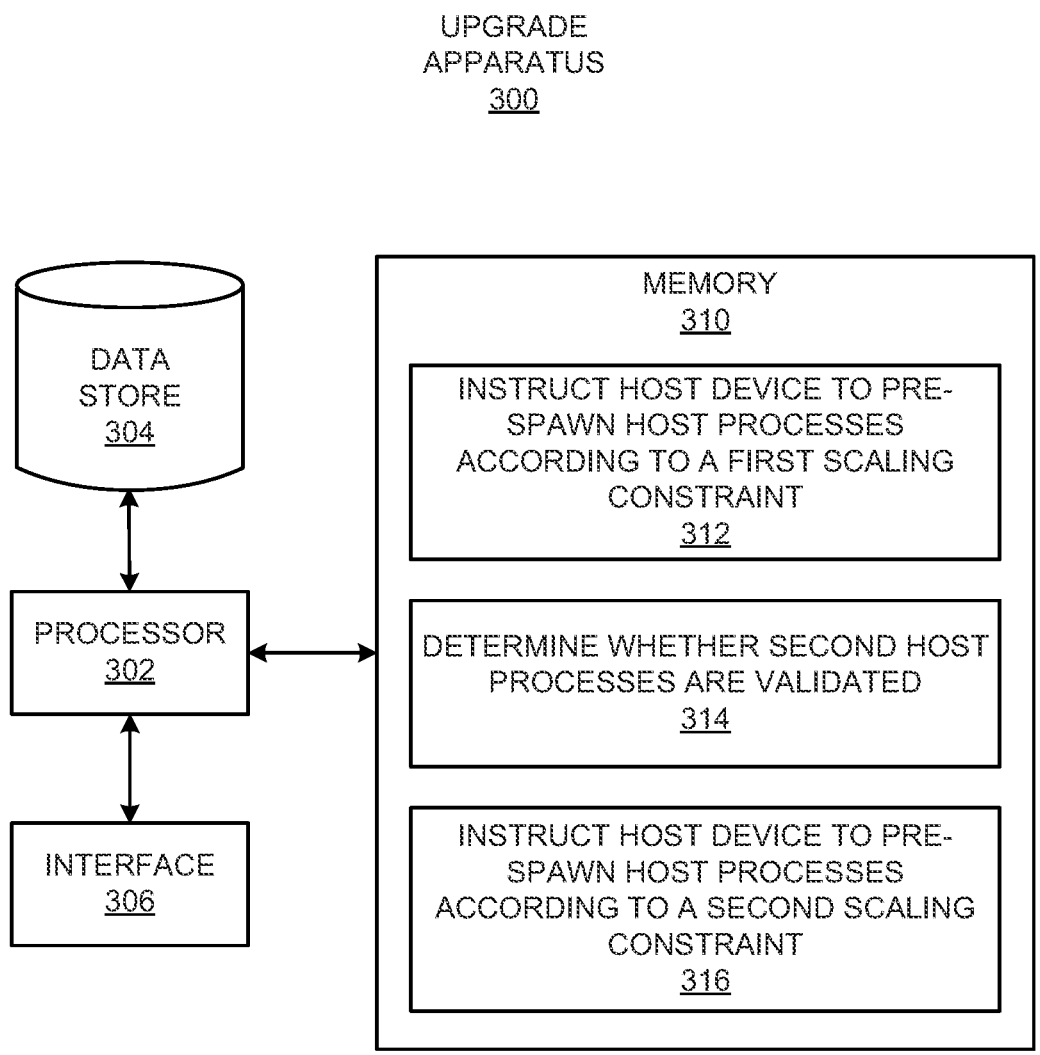
FIG. 3 shows a block diagram of an upgrade apparatus in accordance an embodiment of the present disclosure.

Turning now to FIG. 3, there is shown a block diagram of an upgrade apparatus 300 according to an embodiment of the present disclosure. The upgrade apparatus 300 may be equivalent to the upgrade apparatus 102 discussed above with respect to FIG. 1A and the description of the upgrade apparatus 300 is made with respect to FIGS. 1A and 1B. As shown in FIG. 3, the upgrade apparatus 300 may include a processor 302 that may control operations of the upgrade apparatus 300. The processor 302 may be a semiconductor-based microprocessor, a central processing unit (CPU), an application specific integrated circuit (ASIC), a field-programmable gate array (FPGA), and/or other hardware device. The processor 302 may access a data store 304, which may be a Random Access Memory (RAM), an Electrically Erasable Programmable Read-Only Memory (EEPROM), a storage device, an optical disc, and the like. The processor 302 may also access an interface 306 through which the processor 302 may communicate instructions to a host device and/or to a plurality of host devices in multiple data centers. The interface 306 may be any suitable hardware and/or software that enables the processor 302 to communicate the instructions over a network 106 (shown in FIGS. 1A and 1B).

The upgrade apparatus 300 may also include a memory 310 that may have stored thereon machine readable instructions 312-316 (which may also be termed computer readable instructions) that the processor 302 may execute. The memory 310 may be an electronic, magnetic, optical, or other physical storage device that contains or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The processor 302 may fetch, decode, and execute the instructions 312 to instruct a host device 114 to pre-spawn a number of first host processes 112 that provide a first version of a service 134 in a computing node 120 and to pre-spawn a number of second host processes 112 that provide a second version of the service 134 in the computing node 120, in which the number of first host processes 112 and the number of second host processes 112 are defined in a first scaling constraint. The processor 302 may also execute the instructions 312 to instruct host devices 114 in a plurality of data centers 104 to each pre-spawn host processes 112 according to the first scaling constraint. The processor 302 may fetch, decode, and execute the instructions 314 to determine whether the pre-spawned host processes 112 are validated, e.g., performing as intended. In some embodiments, the processor 302 may execute the instructions 314 to determine whether the pre-spawned host processes 122 that provide the second version of the service 134 are validated. The processor 302 may fetch, decode, and execute the instructions 316 to instruct the host device 114 to pre-spawn host processes 112 according a second scaling constraint in response a determination that the pre-spawned host processes 112 are validated.

Figure 4:
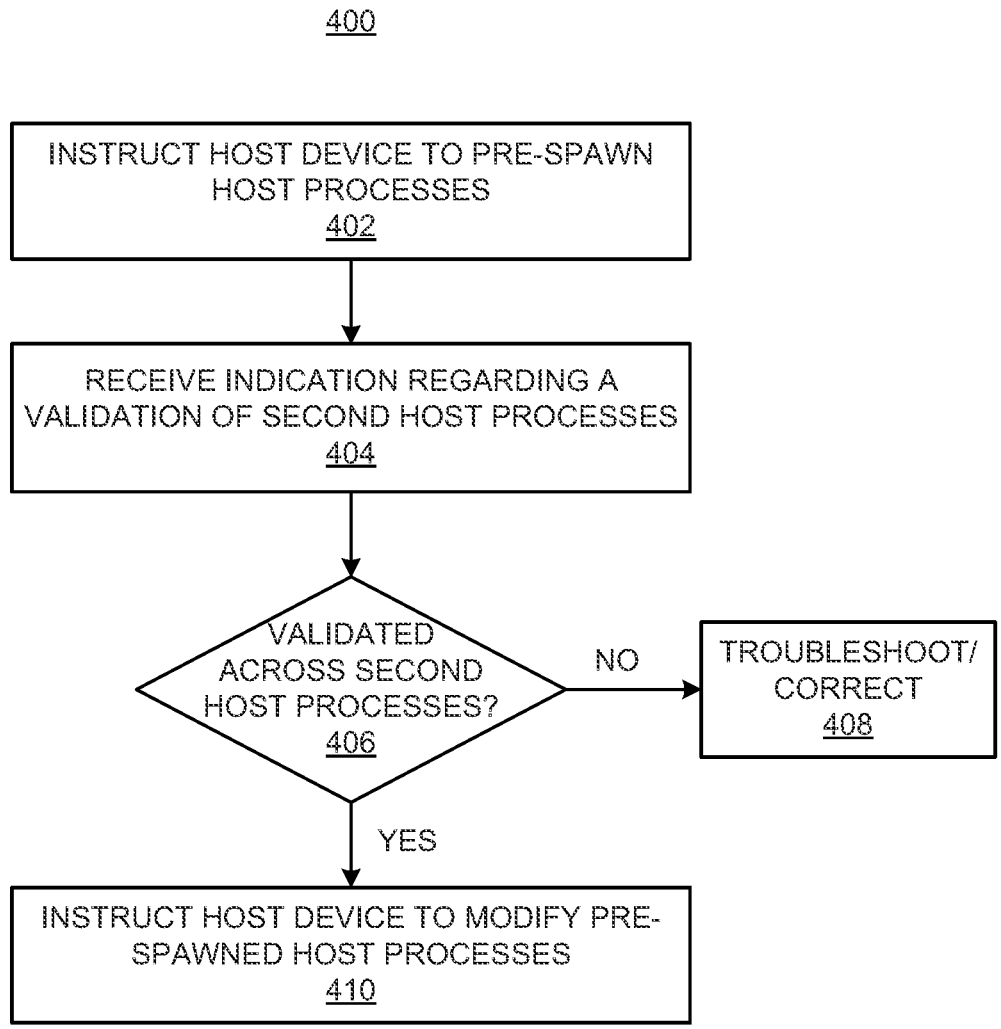
FIG. 4 depicts a flow diagram of a method for upgrading a version of a service in accordance with an embodiment of the present disclosure.

Various manners in which the upgrade apparatus 300 may operate are discussed in greater detail with respect to the method 400 depicted in FIG. 4. Particularly. FIG. 4 depicts a flow diagram of a method 400 for upgrading a version of a service according to an embodiment of the present disclosure. It should be understood that the method 400 depicted in FIG. 4 may include additional operations and that some of the operations described therein may be removed and/or modified without departing from a scope of the method 400. The description of the method 400 is made with reference to the features depicted in FIGS. 1A-3 for purposes of illustration.

At block 402, the processor 302 may execute the instructions 312 to instruct a host device 114 to pre-spawn a number of first host processes 112 that provide a first version of a service 134 in a computing node 120 and to pre-spawn a number of second host processes 112 that provide a second version of the service 134 in the computing node 120, in which the number of first host processes 112 and the number of second host processes 112 are defined in a first scaling constraint. The processor 302 may also execute the instructions 312 at block 402 to instruct host devices 114 in a plurality of data centers 104 to pre-spawn host processes 112 according to the first scaling constraint. The plurality of data centers 104 may be data centers 104 that house computing notes 120 on which instances of the service 134 are executed. The instances of the service 134 may initially be the first version or multiple versions of the service 134.

As part of the instruction at block 402 or as a separate communication, the processor 302 may communicate a first configuration update file 150 to the host device 114. The first configuration update file 150 may include a first scaling constraint that defines the number of first host processes 112 and the number of second host processes 112. That is, the first scaling constraint may define the number of first host processes 112 in a computing node 120 and/or a VM 110 in the computing node 120 that are to host the first version of the service 134 and the number of second host processes 112 in the computing node 120 and/or the VM 110 that are to host the second version of the service 134. In addition or in other embodiments, multiple host devices 114 may pre-spawn the first and second host processes 112 in multiple computing nodes 120 and/or multiple VMs 110 in respective data centers 104 according to the first scaling constraint. Various manners in which a host device 114 may pre-spawn the first and second host processes 112 according to the first constraint are discussed in greater detail with respect to FIGS. 6 and 7 below.

At block 404, the processor 302 may receive an indication regarding a validation of the second host processes 112. That is, the second host processes 112 that provide the second version of the service 134 may be validated and the processor 302 may receive an indication as to whether the second host processes 112 are validated. The indication may be that the second host processes 112 are validated, e.g., the second host processes 112 are operating as intended, or that the second host processes 112 are not validated, e.g., the second host processes 112 are not operating as intended.

At block 406, the processor 302 may execute the instructions 314 to determine whether the pre-spawned second host processes 112 are validated. In response to a determination that the processor 302 received an indication that one or more of the second host processes 112 are not validated, the processor 302 may attempt to troubleshoot and/or correct a problem that may have led to the validation failure as indicated at block 408. The processor 302 may additionally inform an operator of the validation failure. The processor 302 may also receive indications from multiple host devices 114 across multiple data centers 104 and may determine that a second host process 112 in any of the multiple data centers 104 is not validated at block 408.

However, in response to a determination at block 408 that the pre-spawned second host processes 112 are validated, the processor 302 may execute the instructions 318 to instruct the host device 114 to modify the number of pre-spawned second host processes 112 and the number of pre-spawned first host processes 112 in the computing node 120 at block 410. That is, for instance, the processor 302 may communicate an instruction to the host device 114 to decrease the number of first host processes 112 and to increase the number of second host processes 112. Additionally, the processor 302 may not communicate the instruction at block 410 to the host device 114 unless or until the processor 302 determines that each of the second host processes 112 in the computing node 120 are validated. In other embodiments, the processor 302 may not communicate the instruction at block 410 to the host device 114 unless or until the processor 302 determines that each of the second host processes 112 in multiple computing nodes 120 in one or in multiple data centers 104 are validated.

As part of the instruction at block 410 or as a separate communication, the processor 302 may communicate a second configuration update file 152 to the host device 114. The second configuration update file 152 may include a second scaling constraint that defines the number of first host processes 112 and the number of second host processes 112, in which t the numbers differ from those in the first scaling constraint. For instance, the second scaling constraint may flip the numbers of first host processes and the second host processes as compared with the numbers of these host processes in the first scaling constraint. The host device 114 may pre-spawn the host processes 112 in multiple computing nodes 120 and/or multiple VMs 110 according to the second scaling constraint. Various manners in which the host device 114 may pre-spawn the host processes 112 according to the second constraint are discussed in greater detail with respect to FIGS. 6 and 7 below.

Following implementation of the method 400, validated instances of the second version of the service 134 may be provided by VMs 110 in one data center 104 or across multiple data centers 104. In addition, instances of the first version of the service 134 may also be provided by VMs 110 in one data center 104 or across multiple data centers 104. In this regard, the second version of the service 134 may safely be deployed across one or more data centers 104 while also enabling backward compatibility to the first version of the service 134. The host devices 114 may also begin binding the host processes 112 that provide the second version of the service 134 to client sessions.

Figure 5:
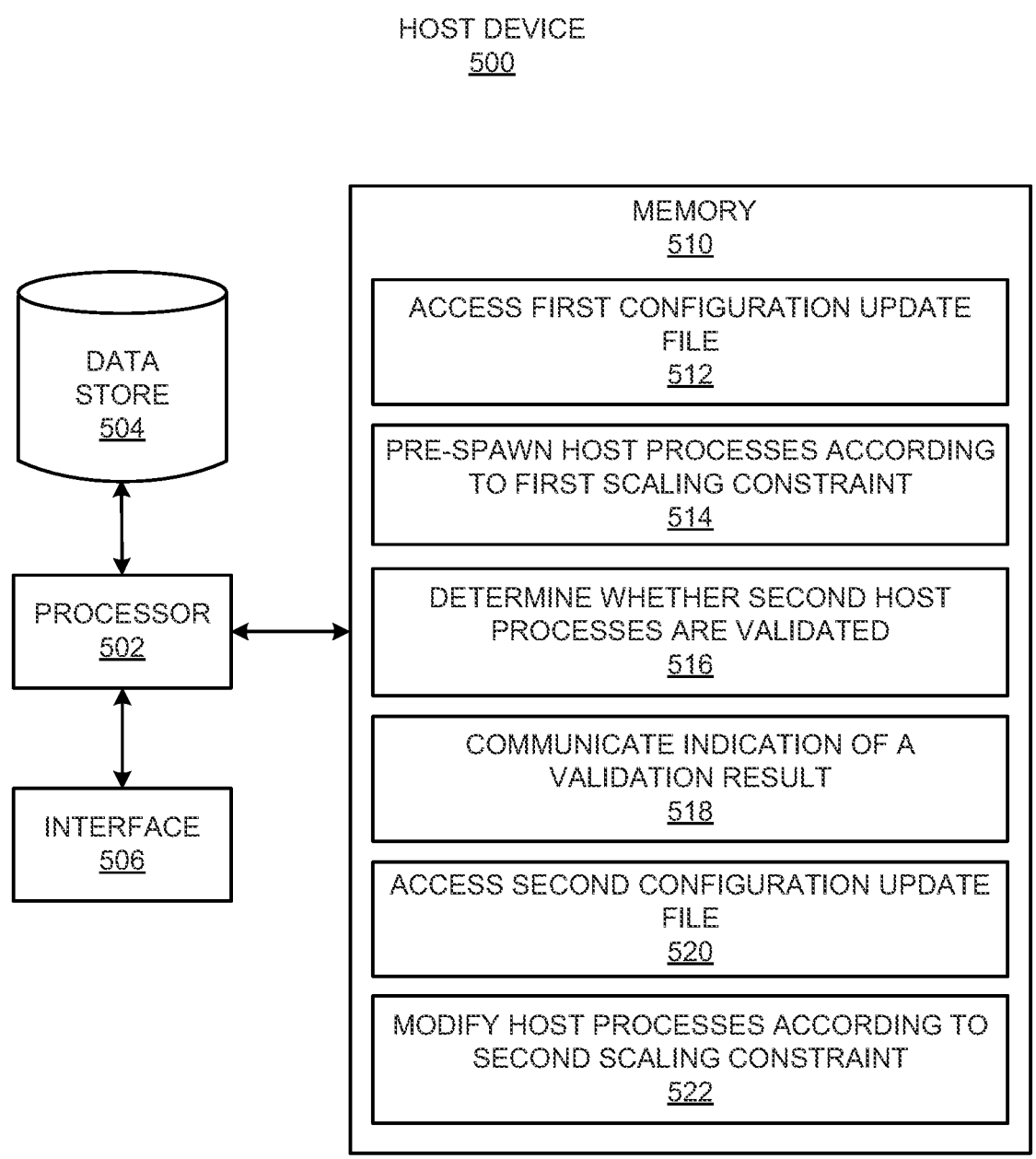
FIG. 5 shows a block diagram of a host device in accordance an embodiment of the present disclosure.

Turning now to FIG. 5, there is shown a block diagram of a host device 500 in accordance with an embodiment of the present disclosure. The host device 500 may be equivalent to the host device 114 of a data center 104 discussed above with respect to FIGS. 1A and 1B and the description of the host device 500 is made with respect to those figures. As shown in FIG. 5, the host device 500 may include a processor 502 that may control operations of the host device 500. The processor 502 may be a semiconductor-based microprocessor, a central processing unit (CPU), an application specific integrated circuit (ASIC), a field-programmable gate array (FPGA), and/or other hardware device. The processor 502 may access a data store 504, which may be a Random Access memory (RAM), an Electrically Erasable Programmable Read-Only Memory (EEPROM), a storage device, an optical disc, and the like. The processor 502 may also access an interface 506 through which the processor 502 may communicate with other host mangers 114, the upgrade apparatus 300, etc. The interface 506 may be any suitable hardware and/or software that enables the processor 502 to communicate with the upgrade apparatus 300 over a network 106 (shown in FIGS. 1A and 1B).

The host device 500 may also include a memory 510 that may have stored thereon machine readable instructions 512-522 (which may also be termed computer readable instructions) that the processor 502 may execute. The memory 510 may be an electronic, magnetic, optical, or other physical storage device that contains or stores executable instructions. The memory 510 may be, for example, Random Access memory (RAM), an Electrically Erasable Programmable Read-Only Memory (EEPROM), a storage device, an optical disc, and the like. The memory 510, which may also be referred to as a computer readable storage medium, may be a non-transitory machine-readable storage medium, where the term "non-transitory" does not encompass transitory propagating signals.

The processor 502 may fetch, decode, and execute the instructions 512 to access a first configuration update file 150. The processor 502 may fetch, decode, and execute the instructions 514 to pre-spawn host processes 112 according to a first scaling constraint contained in the first configuration update file 150. The processor 502 may fetch, decode, and execute the instructions 516 to determine whether second host processes are validated. The processor 502 may fetch, decode, and execute the instructions 518 to communicate an indication of a validation result. The processor 502 may fetch, decode, and execute the instructions 520 to access a second configuration update file 152. The processor 502 may fetch, decode, and execute the instructions 522 to modify the host processes 112 according to a second scaling constraint contained in the second configuration update file 152.

Figure 6:
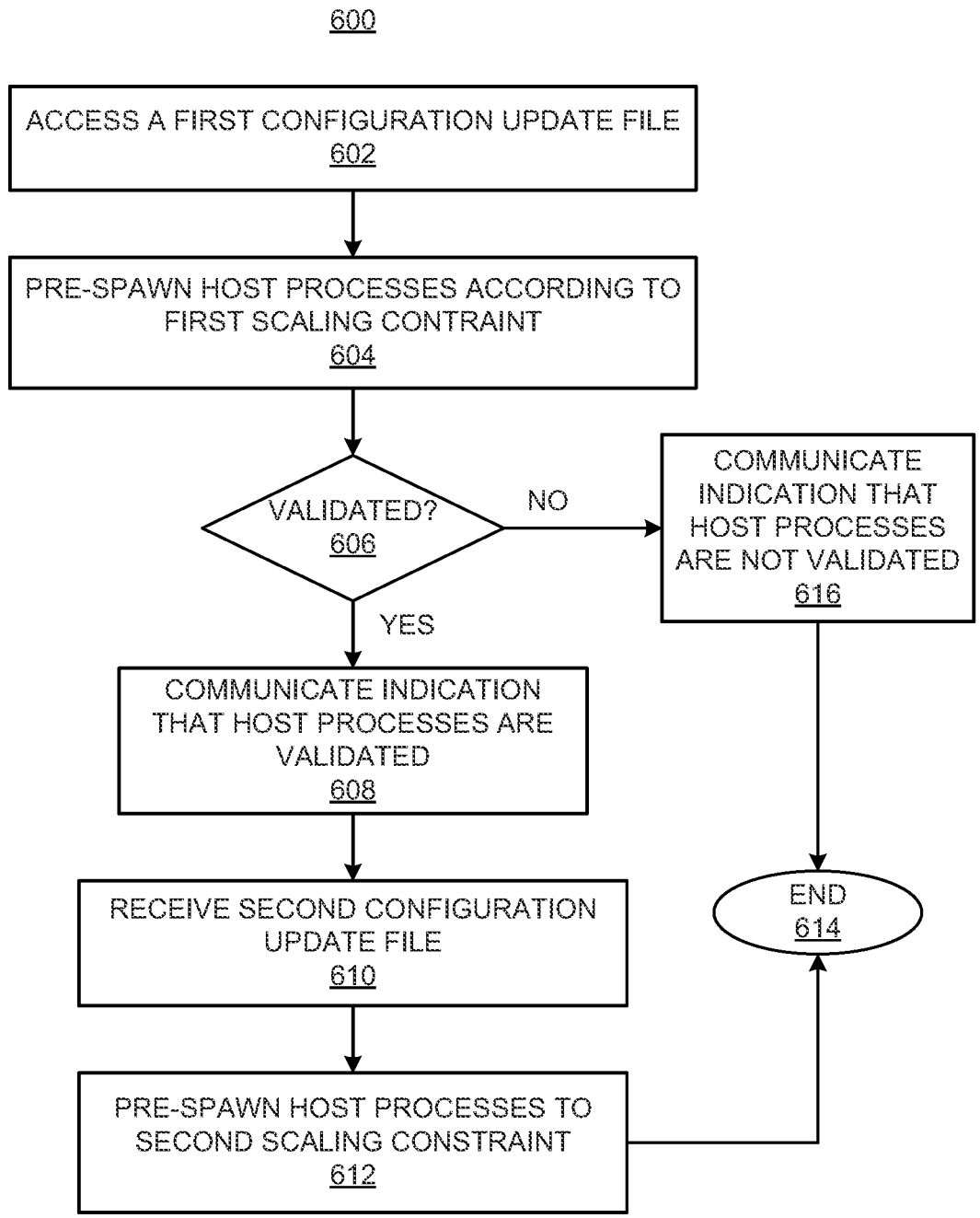
FIG. 6 depicts a flow diagram of a method for upgrading a version of a service in accordance with an embodiment of the present disclosure.
Figure 7:
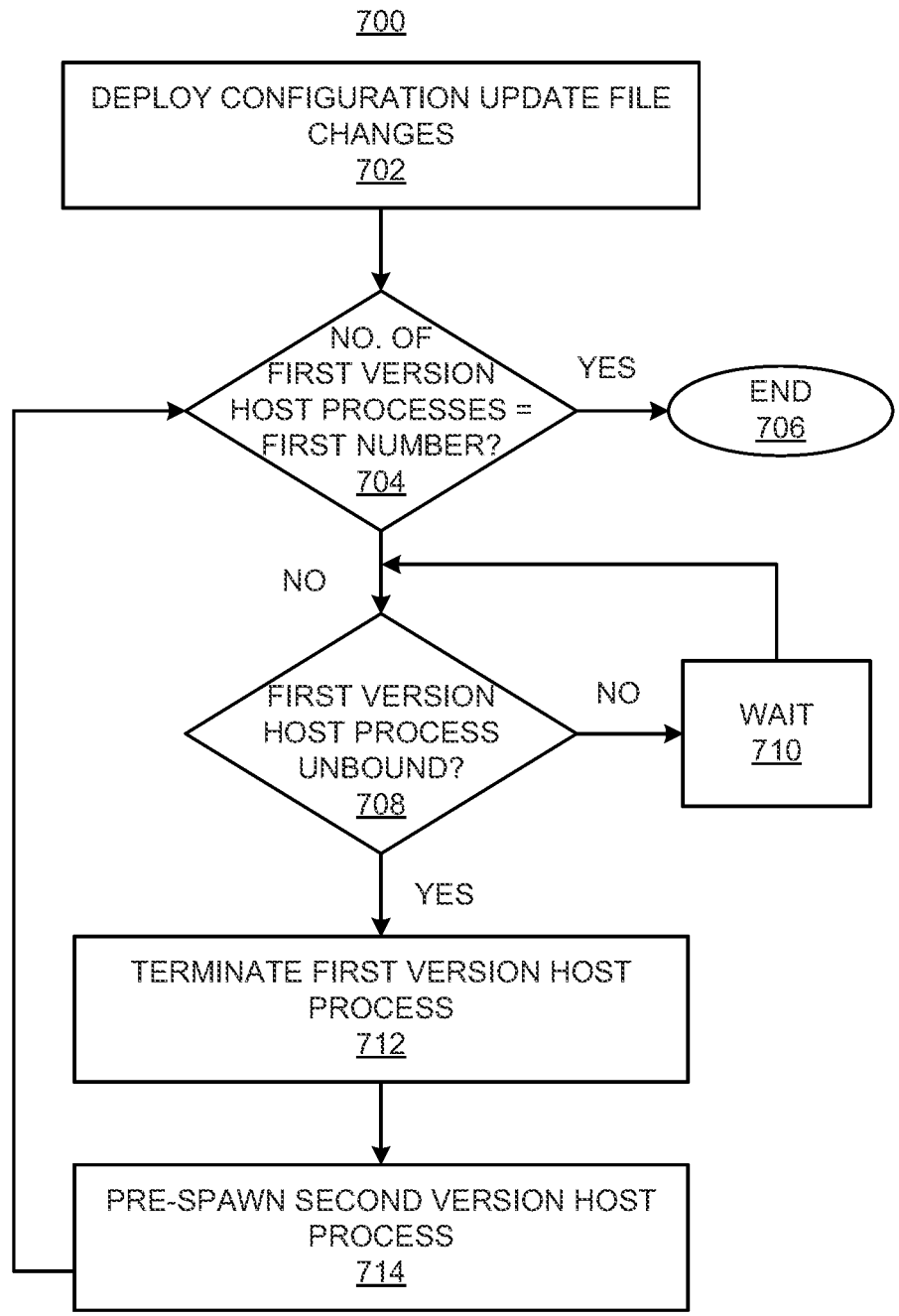
FIG. 7 depicts a flow diagram of a method for incrementally pre-spawning a number of host processes that provide a second version of a service in accordance with an embodiment of the present disclosure.

Various manners in which the host device 500 may operate are discussed in greater detail with respect to the methods 600 and 700 respectively depicted in FIGS. 6 and 7. Particularly, FIG. 6 depicts a flow diagram of a method 600 for upgrading a service in accordance with an embodiment of the present disclosure and FIG. 7 depicts a flow diagram of a method 700 for incrementally pre-spawning a number of host processes that provide a second version of a service in accordance with an embodiment of the present disclosure. It should be understood that the methods 600 and 700 may include additional operations and that some of the operations described herein may be removed and/or modified without departing from the scopes of the methods 600 and 700. The descriptions of the methods 600, 700 are made with reference to the features depicted in FIGS. 1A, 1B, 3, and 5 for purposes of illustration.

At block 602, the processor 502 may execute the instructions 512 to access a first configuration update file 150. The first configuration update file 150 may include a first scaling constraint that defines a number of first host processes 112 that provide a first version of a service 134 and a number of second host processes 112 that provide a second version of the service 134. As discussed above, the first scaling constraint may define the number of first and second host processes 112 in a computing node 120 and/or a VM 110 on the computing node 120 that are to provide the first version of the service 134 and the number of host processes 112 in the computing node 120 and/or the VM 110 that are to provide the second version of the service 134.

The first scaling constraint may define the number of first host processes 112 to be greater than the number of second host processes 112. By way of particular example in which the first scaling constraint defines the number of host processes 112 in a VM 110 that is able to execute 50 host processes 112, the first scaling constraint may define the number of first host processes 112 to be 48 host processes and the number of second host processes 112 to be two host processes.

At block 604, the processor 502 may execute the instructions 514 to pre-spawn host processes 112 according to the first scaling constraint. That is, the processor 502 may pre-spawn the number of first host processes 112 as defined in the first scaling constraint. In some examples, all of the host processes 112 on a VM 110 may already provide the first version of the service 134 and thus, the pre-spawning of the first host processes 112 may include reducing the number of first host processes 112. The processor 502 may also pre-spawn the number of second host processes 112 as defined in the first scaling constraint.

According to examples, the processor 502 may incrementally pre-spawn the first host processes 112 and the second host processes 112. That is, the processor 502 may not automatically pre-spawn the first and second host processes 112 as defined in the configuration update file 150 as that may result in existing client sessions being dropped. Instead, in the method 700 shown in FIG. 7, at block 702, the processor 502 may deploy the configuration update file changes to initiate the pre-spawning process at block 604.

In addition, at block 704, the processor 502 may determine whether the number of first host processes 112 is equal to a first number of host services defined in the first scaling constraint, in which the first number defines the number of first host processes 112. The determination at block 704 may also be a determination as to whether the number of second host processes 112 is equal to a second number of host processes defined in the first scaling constraint, in which the second number defines the number of second host processes 112. In response to a determination that the number of first host processes 112 is equal to the first number and/or that the number of second host processes 112 is equal to the second number, the method 700 may end as indicated at block 706. The method 700 may end at block 706 as the number of first host processes 112 and the number of second host processes 112 may have reached the defined numbers in the first scaling constraint.

However, in response to a determination that the number of first host processes 112 is not equal to the first number and/or that the number of second host processes 112 is not equal to the second number, the processor 502 may determine, at block 708, whether any of the first host processes 112 is unbound to a client session. In response to a determination that none of the first host processes 112 is unbound to a client session, the processor 502 may wait for a period of time as indicated at block 710. The processor 502 may wait for a period of time, e.g., a second, a minute, an hour, etc., before making another determination at block 708. The processor 502 may repeat blocks 708-710 until the processor 402 determines that one of the first host processes 112 is unbound to a client session at block 708.

In response to a determination at block 708 that a first host process 112 is unbound to a client session, the processor 502 may terminate that first host process 112, as indicated at block 712. In addition, at block 714, the processor 502 may pre-spawn a second host process 112 that provides the second version of the service 134.

Following block 714, the processor 502 may repeat block 704 to determine whether the termination of the first host process 112 at block 712 and the pre-spawning of the second host process 112 at block 714 resulted in the numbers of the first and second host processes 112 equaling the numbers for the first and second host processes 112 defined in the first scaling constraint. As above, in response to the numbers of first and second host processes 112 equaling the numbers defined in the first scaling constraint, the method 700 may end at block 706. However, in response to the numbers of first and second host processes 112 not equaling the numbers defined in the first scaling constraint, blocks 706-714 may be repeated until the numbers of the first and second host processes 112 are determined to equal the numbers defined in the first scaling constraint.

Through implementation of the method 700, the first host processes 112 that are currently bound to client sessions may be gradually terminated to avoid disrupting the client sessions.

With reference back to FIG. 6, following block 604, the processor 502 may execute the instructions 516 to determine, at block 606, whether the second host processes 112 are validated. That is, the processor 502 may execute runners, e.g., test scripts, on the second host processes 112 to determine whether the second host processes 112 are operating as intended. In other examples, another element may perform the validation and the processor 502 may receive results of the validation from the other element. In response to a determination that the second host processes 112 are validated, the processor 502 may execute the instructions 518 to communicate an indication that the second host processes 112 are validated to the upgrade apparatus 114, 300.

In addition, at block 610, the processor 502 may execute the instructions 520 to receive a second configuration update file 152 from the upgrade apparatus 114, 300. As discussed above, the processor 502 may receive the second configuration update file 152 when the processor 302 in the upgrade apparatus 300 determines that the second host processes 112 have been validated, e.g., on a computing node 120, on multiple computing nodes 120, across data centers 104, etc. Thus, for instance, the processor 502 may not receive the second configuration update file 152 unless the each of the second host processes 112 have been validated.

The second configuration update file 152 may include a second scaling constraint that defines the number of first host processes 112 in a computing node 120 and/or a VM 110 on the computing node 120 that are to host the first version of the service 134 and the number of second host processes 112 in the computing node 120 and/or the VM 110 that are to host the second version of the service 134. The second scaling constraint differs from the first scaling constraint and in some embodiments, flips the numbers of first and second host processes 112. Thus, with reference to the example provided above, the second scaling constraint may define the number of first host processes 112 to be two host processes and the number of second host processes 112 to be 48 host processes.

At block 612, the processor 502 may execute the instructions 522 to modify the host processes 112 according to the second scaling constraint. That is, the processor 502 may modify, e.g., terminate, the first host processes 112 such that the number of first host processes 112 reaches the number of first host processes 112 that are to provide the first version of the service 134 as defined in the second scaling constraint. The processor 502 may also modify, e.g., pre-spawn, the second host processes 112 such that the number of second host processes 112 reaches the number of second host processes 112 as defined in the second scaling constraint.

According to examples, the processor 502 may incrementally modify the first host processes 112 and the second host processes 112 at block 612. That is, the processor 502 may not automatically modify the host processes 112 as defined in the second scaling constraint as that may result in existing client sessions being dropped. Instead, in the method 700 shown in FIG. 7, at block 702, the processor 502 may deploy the configuration update file changes of the second configuration update file 152 to initiate the pre-spawning process at block 612.

In addition, at block 704, the processor 502 may determine whether the number of first host processes 112 is equal to a first number of host services defined in the second scaling constraint, in which the first number defines the number of first host processes 112. The determination at block 704 may also be a determination as to whether the number of second host processes 112 is equal to a second number of host processes defined in the second scaling constraint, in which the second number defines the number of second host processes 112. In response to a determination that the number of first host processes 112 is equal to the first number and/or that the number of second host processes 112 is equal to the second number, the method 700 may end as indicated at block 706. The method 700 may end at block 706 as the number of first host processes 112 and the number of second host processes 112 may have reached the defined numbers in the second scaling constraint.

Additionally, the processor 502 may execute blocks 704-714 as discussed above until the numbers of the first and second host processes 112 are determined to equal the first and second numbers defined in the second scaling constraint. As also discussed above, in response to the numbers of host processes 112 equaling the numbers defined in the second scaling constraint, the method 700 may end at block 706. In this regard, the first host processes 112 that are currently bound to client sessions may be gradually terminated and the second host processes 112 may be gradually spun up to avoid disrupting client sessions, while providing backward compatibility to the first version of the service 134.

Following block 612, the method 600 may end as indicated at block 614. In addition, with reference back to block 606, in response to a determination that one or more of the second host processes 112 was not validated, the processor 502 may communicate an indication to the upgrade apparatus 114, 300 that not all of the second host processes 112 were validated, as indicated at block 616. The method 600 may also end following block 616 as the upgrading of the service 134 may be stalled or ceased. The method 600 may be continued, for instance, following a subsequent validation of the second host processes 112.

Although particular reference is made in the description of the methods 600, 700 to host processes 112 on a single VM 110, it should be understood that these descriptions are applicable to multiple VMs 110. That is, the processor 502 and/or multiple processors 502 may execute the methods 600, 700 on multiple VMs 110 in multiple computing nodes 120 and across multiple data centers 104.

Some or all of the operations set forth in the methods 400, 600, and 700 may be contained as utilities, programs, or subprograms, in any desired computer accessible medium. In addition, the methods 400, 600, and 700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine readable instructions that cause the processor to:
      instruct a host device to:
         pre-spawn a number of first host processes configured to provide a first version of a service in one or more computing nodes; and
         pre-spawn a number of second host processes configured to provide a second version of the service in the one or more computing nodes, wherein the number of first host processes and the number of second host processes are defined in a first scaling constraint and are each greater than or equal to one, wherein the host device pre-spawns the second host processes in each of the one or more computing nodes through:
            identification of a host process of the first host processes that is unbound from a client session;
            termination of the identified host process; and
            pre-spawning of a second host process that provides the second version of the service based on termination of the identified host process; and
         in response to receipt of an indication that each of the second host processes in the one or more computing nodes is operating properly, instruct the host device to decrease the number of first host processes and to increase the number of second host processes in the one or more computing nodes as defined in a second scaling constraint.

2. The apparatus according to claim 1, further comprising instructions that cause the processor to:
   communicate a first configuration file containing the first scaling constraint to the host device, the number of first host processes being greater than the number of second host processes in the first scaling constraint; and
   communicate a second configuration file containing the second scaling constraint to the host device, the number of first host processes being lesser than the number of second host processes in the second scaling constraint.

3. The apparatus according to claim 2, wherein the host device decreases the number of first host processes and increases the number of second host processes in the one or more computing nodes by:
   identifying first host processes that are unbound from client sessions;

terminating the identified first host processes until a count of the first host processes is equal to the number of first host processes as defined in the second scaling constraint; and incrementally, as the identified first host processes are terminated, pre-spawning second host processes that provide the second version of the service until a count of the second host processes is equal to the number of second host processes defined in the second scaling constraint.

4. The apparatus according to claim 1, wherein runners are executed on the second host processes to validate the second host processes in the one or more computing nodes.

5. The apparatus according to claim 1, wherein the host device pre-spawns the first host processes and pre-spawns the second host processes in the one or more computing nodes as respective instances on a plurality of virtual machines.

6. The apparatus according to claim 1, wherein the instructions cause the processor to:
   instruct a second host device to:
      pre-spawn the number of first host processes configured to provide the first version of the service in a second set of computing nodes; and
      pre-spawn the number of second host processes configured to provide the second version of the service in the second set of computing nodes;
   receive an indication that each of the second host processes in the second set of computing nodes is operating properly; and
   instruct the host device to decrease the number of first host processes and to increase the number of second host processes in response to also receiving the indication from the second set of computing nodes.

7. The apparatus according to claim 6, wherein the host device is in a first data center and the second host device is in a second data center, and wherein the instructions cause the processor to:
   instruct the host device in the first data center to pre-spawn the first host processes and the second host processes in the one or more computing nodes asynchronously with instructing the second host device in the second data center to pre-spawn the first host processes and the second host processes in the second set of computing nodes.

8. The apparatus according to claim 7, wherein the instructions cause the processor to:
   receive an indication from at least one of the host device and the second host device that a second host process in a computing node is not operating properly; and
   in response to receipt of the indication that a second host process is not operating properly in the computing node, end upgrading of the version of the service across the one or more computing nodes.

9. A method comprising:
   accessing, by a processor, a first configuration update file including a first scaling constraint that defines a number of first host processes that provide a first version of a service and a number of second host processes that provide a second version of the service, the number of first host processes and the number of second host processes each being greater than or equal to one;
   pre-spawning, by the processor, the number of first host processes on one or more computing nodes as defined in the first scaling constraint;
   pre-spawning, by the processor, the number of second host processes on one or more computing nodes as defined in the first scaling constraint by:
      identifying a host process of the first host processes that is unbound from a client session;
      terminating the identified host process; and
      pre-spawning a second host process that provides the second version of the service based on termination of the identified host process;
   determining that the second host processes are operating properly;
   communicating an indication that the second host processes are operating normally to an upgrade apparatus; and
   in response to receipt of an instruction responsive to the communication of the indication from the one or more computing nodes,
      decreasing, by the processor, the number of first host processes; and
      increasing, by the processor, the number of second host processes in the one or more computing nodes as defined in a second scaling constraint.

10. The method according to claim 9, wherein the second number of first host processes and the second number of second host processes defined in the second scaling constraint are flipped versions of the number of first host processes and the number of second host processes in the first scaling constraint.

11. The method according to claim 9, further comprising:
   receiving a second configuration update file from the upgrade apparatus, the second configuration update file including the second scaling constraint that defines a second number for the first host processes and a second scaling constraint that defines a second number for the second host processes; and
   in response to receipt of the second configuration update file,
      modifying the number of first host processes to equal the second number of first host processes; and
      modifying the number of second host processes to equal the second number of second host processes.

12. The method according to claim 11, wherein modifying the number of first host processes and modifying the number of second host processes, further comprises:
   identifying host processes of the first host processes that are unbound from client sessions;
   terminating the identified host processes until a count of the host processes of the first host processes is equal to a second number of host processes as defined in the second scaling constraint; and
   incrementally, as the identified host processes of the first host processes are terminated, pre-spawning second host processes that provide the second version of the service in the one or more computing nodes until a count of the second host processes is equal to a second number of second host processes as defined in the second scaling constraint.

13. The method according to claim 9, wherein determining that the second host processes are operating normally further comprises:
   executing runners on the second host processes to determine whether the second host processes are operating normally in the one or more computing nodes.

14. The method according to claim 9, further comprising:
   pre-spawning the number of first host processes as respective instances on virtual machines in the one or more computing nodes.

15. The method according to claim 9, further comprising:
pre-spawning the number of second host processes as respective instances on virtual machines in the one or more computing nodes.

16. A non-transitory computer-readable medium on which is stored computer-readable instructions that when executed by a processor, cause the processor to:
access a first configuration update file including a first scaling constraint that defines a number of first host processes that provide a first version of a service and a number of second host processes that provide a second version of the service, the number of first host processes and the number of second host processes each being greater than or equal to one;
pre-spawn the number of first host processes on one or more computing nodes as defined in the first scaling constraint;
pre-spawn the number of second host processes on one or more computing nodes as defined in the first scaling constraint by:
identifying a host process of the first host processes that is unbound from a client session;
terminating the identified host process; and
pre-spawning a second host process that provides the second version of the service based on termination of the identified host process;
determining that the second host processes are operating properly;
communicating an indication that the second host processes are operating normally to an upgrade apparatus; and
in response to receipt of an instruction responsive to the communication of the indication from the one or more computing nodes,
decrease the number of first host processes; and
increase the number of second host processes in the one or more computing nodes as defined in a second scaling constraint.

17. The non-transitory computer-readable medium according to claim 16, wherein the computer-readable instructions are further to cause the processor to:
receive a second configuration update file from the upgrade apparatus, the second configuration update file including the second scaling constraint that defines a second number for the first host processes and a second scaling constraint that defines a second number for the second host processes; and
in response to receipt of the second configuration update file,
modify the number of first host processes to equal the second number of first host processes; and
modify the number of second host processes to equal the second number of second host processes.

18. The non-transitory computer-readable medium according to claim 17, wherein the computer-readable instructions are further to cause the processor to:
identify host processes of the first host processes that are unbound from client sessions;
terminate the identified host processes until a count of the host processes of the first host processes is equal to a second number of host processes as defined in the second scaling constraint; and
incrementally, as the identified host processes of the first host processes are terminated, pre-spawn second host processes that provide the second version of the service in the one or more computing nodes until a count of the second host processes is equal to a second number of second host processes as defined in the second scaling constraint.

19. The non-transitory computer-readable medium according to claim 16, wherein the computer-readable instructions are further to cause the processor to:
execute runners on the second host processes to determine whether the second host processes are operating normally in the one or more computing nodes.

20. The non-transitory computer-readable medium according to claim 16, wherein the computer-readable instructions are further to cause the processor to:
pre-spawn the number of first host processes as respective instances on virtual machines in the one or more computing nodes; and
pre-spawn the number of second host processes as respective instances on the virtual machines in the one or more computing nodes.

* * * * *